N. M. SCHARNBERG.
FRUIT JAR WRENCH AND HOLDER.
APPLICATION FILED JAN. 21, 1919.
1,299,511.
Patented Apr. 8, 1919.
2 SHEETS—SHEET 1.
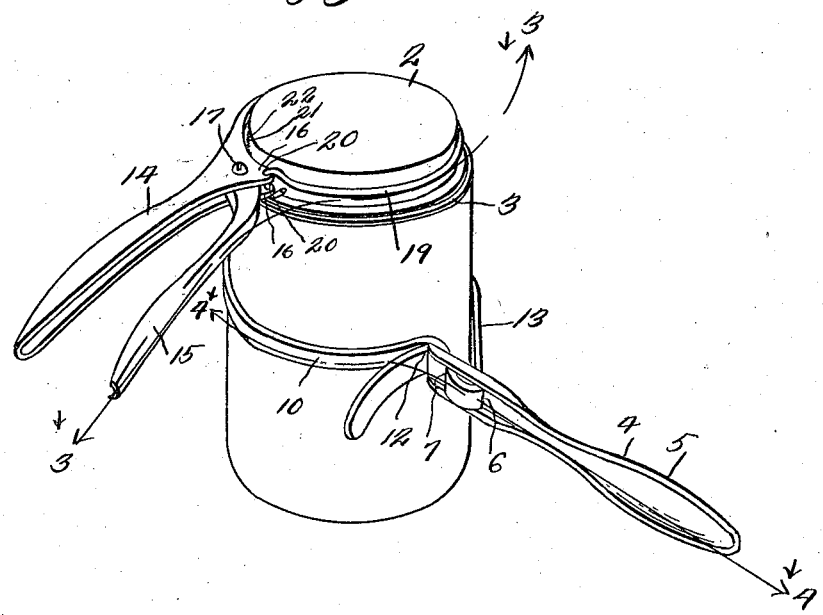
Inventor
N. M. Scharnberg N. M. SCHARNBERG.
FRUIT JAR WRENCH AND HOLDER.
APPLICATION FILED JAN. 21, 1919.
1,299,511.
Patented Apr. 8, 1919.
2 SHEETS—SHEET 2.
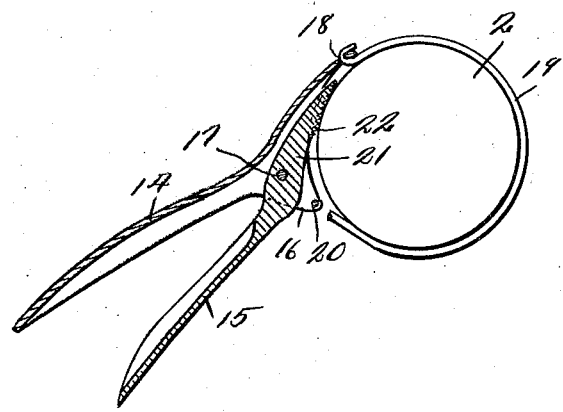
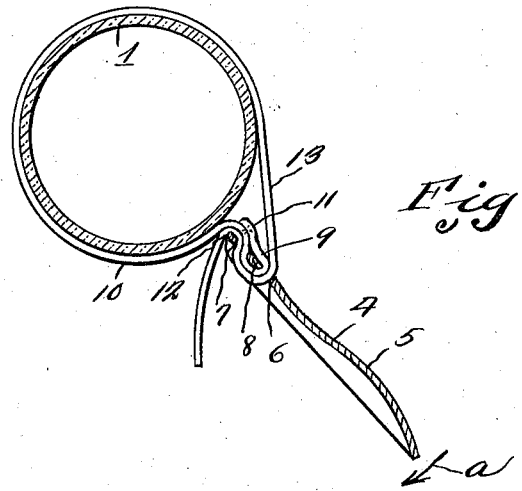
Inventor
N. M. Scharnberg

UNITED STATES PATENT OFFICE.

NANNING M. SCHARNBERG, OF MICHIGAN CITY, INDIANA.

FRUIT-JAR WRENCH AND HOLDER.

1,299,511.

Specification of Letters Patent. Patented Apr. 8, 1919.

Application filed January 21, 1919. Serial No. 272,274.

*To all whom it may concern:*

Be it known that I, NANNING M. SCHARNBERG, a citizen of the United States, residing at Michigan City, in the county of Laporte, State of Indiana, have invented a new and useful Fruit-Jar Wrench and Holder; and I do hereby declare the following to be a full, clear, and exact description of the invention, such as will enable others skilled in the art to which it appertains to make and use the same.

The invention relates to wrenches whereby covers for fruit jars and the like may be easily screwed on the jars or removed as desired. Fruit jar covers as a rule become stuck and it is often impossible to remove the same, by unscrewing by hand. Also during the operation of putting the covers on the jars, it is impossible, when the jars are hot to screw the covers on to their maximum binding positions on the rubber washers, therefore it is the object to obviate these difficulties.

A further object is to provide means, whereby the covers on jars may be screwed securely on the jars and also to provide means whereby the jars may be held against rotation during this operation, this holding means for the jars being necessary so that the jar covers may be screwed down to their maximum position as it is impossible to properly hold the jars with the hand. In the operation of canning it is desirable to securely place the covers on the jars, while the contents therein is hot, therefore the jar holding means allows of this operation while the contents of the same is extremely hot, in this way preventing the burning of the hands, which is caused by trying to hold the jar at the same time that the canner is trying to screw the cover thereon.

With the above and other objects in view, the invention resides in the combination and arrangement of parts as hereinafter described, shown in the drawings and claimed, it being understood that changes in the precise embodiment of the invention may be made within the scope of what is claimed without departing from the spirit of the invention.

In the drawings:—

Figure 1 is a perspective view of a fruit jar, showing the cover wrench applied thereto and the jar holder in operative position on the jar.

Fig. 2 is a top plan view of the same.

Fig. 3 is a sectional view through the jar cover removing wrench taken on line 3—3 of Fig. 1.

Fig. 4 is a sectional view through the jar holding wrench, taken on line 4—4 of Fig. 1.

Referring to the drawings the numeral 1 designates a conventional form of fruit jar and 2 a conventional form of fruit jar cover of the type that screws on the jar, there being a rubber washer 3 against which the cover is adapted to bind.

The jar holding wrench 4 comprises the hand engaging portion 5 having at its end apertures 6 and 7. Passing around the post 8, which is formed by means of the apertures 6 and 7 is the end 9 of the strap 10, the end 9 being secured to the body portion of the strap as at 11. The body portion 10 of the strap passes around the body of the fruit jar 1, thence through the aperture 6 and then through the aperture 7, the free end then passing around the end 12 of the handle member of the wrench 4, between the end thereof and the body portion 10 of the strap. It will be seen that by exerting a pull upon the handle member 4, in the direction of the arrow *a* in Fig. 4 that the end 12 of the handle member will bind the strap against slipping and at the same time by pulling on the portion 13 of the strap body portion 10 will securely hold the jar. However when it is desired to hold the jar against rotation in the other direction, while removing the jar cover from 'the jar, the jar holder may be reversed on the jar.

The cap wrench comprises the hand engaging members 14 and 15, the member 14 being formed from a single piece of sheet metal so as to form the ears 16 and between these ears 16 the hand engaging member 15 is pivoted on the screw 17. Secured as at 18, to the end of the member 14 is one end of a flexible band 19, which is adapted to extend around the fruit jar cap 2, its other end passing through registering eyes 20 in the ears 16. The portion 21 of the hand engaging member 15 is adapted to engage the periphery of the jar cover, its cover engaging surface being provided with teeth 22 which assure the binding of the cover in the loop 19 and also prevent the wrench from slipping during a wrenching operation.

When it is desired to remove the cover from the jar, the loop 19 is placed over and around the cover 2, then the operator grasps the hand engaging members and squeezes them together. This squeezing operation causes the end 21 of the member 15 to be forced against the periphery of the jar cap and also securely binds the flexible band around the same. When in this position a turning or pulling action is imparted to the cap wrench and the cap either screwed on or off of the jar. However when it is desired to set the caps up on the washer 3 as far as possible, the jar holder is placed around the jar so as to hold the same from turning in the hand, or if the fruit is being put up hot the jar holder may be used to prevent the burning of the canner's hands.

The invention having been set forth, what is claimed as new and useful is:—

1. A jar cap removing wrench comprising a pair of pivoted members having hand engaging portions at one of their ends, a flexible cap engaging member having its ends secured to one of said pivoted members and the other member being so pivoted that one of its ends will engage the periphery of the jar cap between the securing points of the ends of the flexible cap engaging band when a squeezing action is applied to the hand engaging ends of the pivoted members.

2. A jar cap removing wrench comprising a pair of pivoted members having hand engaging portions at one of their ends, one of said members being formed from a single piece of sheet metal so as to form a pair of ears, the other pivoted member pivoted between said ears, one end of a flexible band being secured to one end of said member and its other end secured to the ears, the pivoted member that is pivoted between the ears being so pivoted that when a squeezing action is applied to the handle ends of the pivoted members its other end will engage the periphery of the jar cap at a point between the securing ends of the flexible band thereby securely binding the band around the cap and also preventing slipping of the wrench when a turning action is applied to the wrench.

In testimony whereof I have signed my name to this specification in the presence of two subscribing witnesses.

NANNING M. SCHARNBERG.

Witnesses:
CLYDE L. TAYLOR,
CHAS. W. TOWN.

Copies of this patent may be obtained for five cents each, by addressing the "Commissioner of Patents, Washington, D. C."